United States Patent
Kim et al.

(10) Patent No.: US 8,780,845 B2
(45) Date of Patent: Jul. 15, 2014

(54) METHOD AND APPARATUS FOR DETERMINING SIZE OF TRANSPORT BLOCK TRANSMITTED BY BASE STATION TO RELAY NODE IN RADIO COMMUNICATION SYSTEM

(75) Inventors: Hakseong Kim, Anyang-si (KR); Kijun Kim, Anyang-si (KR); Joonkui Ahn, Anyang-si (KR); Hanbyul Seo, Anyang-si (KR); Daewon Lee, Anyang-si (KR); Inkwon Seo, Anyang-si (KR); Byounghoon Kim, Anyang-si (KR); Bonghoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 13/522,942

(22) PCT Filed: Mar. 7, 2011

(86) PCT No.: PCT/KR2011/001550
§ 371 (c)(1),
(2), (4) Date: Jul. 18, 2012

(87) PCT Pub. No.: WO2011/111961
PCT Pub. Date: Sep. 15, 2011

(65) Prior Publication Data
US 2012/0320816 A1  Dec. 20, 2012

Related U.S. Application Data

(60) Provisional application No. 61/410,346, filed on Nov. 4, 2010, provisional application No. 61/387,964, filed on Sep. 29, 2010, provisional application No. 61/313,125, filed on Mar. 12, 2010, provisional application No. 61/312,234, filed on Mar. 9, 2010, provisional application No. 61/311,380, filed on Mar. 7, 2010.

(51) Int. Cl.
*H04W 4/00* (2009.01)
*H04W 72/04* (2009.01)
*H04L 5/00* (2006.01)
*H04W 72/00* (2009.01)

(52) U.S. Cl.
CPC ........ *H04W 72/042* (2013.01); *H04W 72/0446* (2013.01); *H04W 72/044* (2013.01); *H04L 5/0007* (2013.01); *H04W 72/0406* (2013.01); *H04L 5/0005* (2013.01); *H04W 72/04* (2013.01); *H04W 72/00* (2013.01)
USPC ............ 370/329; 370/330; 370/332; 370/328

(58) Field of Classification Search
CPC .......... H04W 72/042; H04W 72/0446; H04W 72/0044; H04W 72/044; H04W 72/0406; H04W 72/04; H04W 72/00; H04L 5/0007; H04L 5/0005; H04L 5/0003; H04J 11/00
USPC ......................... 370/329, 330, 328, 281, 332
See application file for complete search history.

(56) References Cited

PUBLICATIONS

3rd Generation Partnership Project (3GPP), "Technical Specification Group Radio Access Network; Further Advancements for E-UTRA Physical Layer Aspects (Release 9)", 3GPP TR 36.814 v1.7.0, Feb. 2010.
InterDigital, "FDD Relay Type I Backhaul interference and HARQ issues", R2-095634, 3GPP TSG-RAN WG2 Meeting #67bis, Oct. 2009.
Nokia Siemens Networks et al., "Further Aspects of Control Channel for Relay Backhaul link", R1-092565, 3GPP TSG RAN WG1 Meeting #57bis, Jun. 2009.

*Primary Examiner* — Kwang B Yao
*Assistant Examiner* — Adam Duda
(74) *Attorney, Agent, or Firm* — Lee, Hong, Degerman, Kang & Waimey

(57) ABSTRACT

A method for receiving a Relay node dedicated Physical Downlink Shared Channel (R-PDSCH) from a base station by a relay node in a radio communication system is disclosed.

The method includes receiving, from the base station, a Modulation and Coding Scheme (MCS) index and the number NR-PDSCHPRB1 of first resource blocks to which the R-PDSCH is transmitted, under the assumption that a Relay node dedicated Physical Downlink Control Channel (R-PDCCH) is not transmitted, estimating the number NR-PDSCHPRB2 of second resource blocks to which the R-PDSCH is actually transmitted, using the number NR-PDSCHPRB1 of the first resource blocks and using the number NR-PDCCHPRB of resource blocks to which the R-PDCCH is transmitted, selecting the size of a transport block mapped to the R-PDSCH, using the number NR-PDSCHPRB2 of the second resource blocks and using a transport block index corresponding to the MCS index, and decoding the R-PDSCH, using the size of the transport block and using a modulation order corresponding to the MCS index.

8 Claims, 16 Drawing Sheets

(a) contol - plane protocol stack (b) user - plane protocol stack

< FDM + TDM >

< FDM >

1 subframe 1 subframe

US 8,780,845 B2

METHOD AND APPARATUS FOR DETERMINING SIZE OF TRANSPORT BLOCK TRANSMITTED BY BASE STATION TO RELAY NODE IN RADIO COMMUNICATION SYSTEM

CROSS-REFERENCE TO RELATED APPLICATIONS

This application is the National Stage filing under 35 U.S.C. 371 of International Application No. PCT/KR2011/001550, filed on Mar. 7, 2011, which claims the benefit of U.S. Provisional Application Ser. No. 61/410,346, filed on Nov. 4, 2010, 61/387,964, filed on Sep. 29, 2010, 61/313,125, filed on Mar. 12, 2010, 61/312,234, filed on Mar. 9, 2010, and 61/311,380, filed on Mar. 7, 2010, the contents of which are all incorporated by reference herein in their entirety.

TECHNICAL FIELD

The present invention relates to radio communication systems, and more particularly, to a method and apparatus for determining the size of a transport block transmitted by a base station to a relay node in a radio communication system.

BACKGROUND ART

A 3rd Generation Partnership Project Long Term Evolution (3GPP LTE) communication system, which is an example of a radio communication system to which the present invention may be applied, will now be described in brief.

FIG. 1 is a diagram schematically showing a network structure of an Evolved Universal Mobile Telecommunications System (E-UMTS) as an exemplary radio communication system. The E-UMTS system has evolved from the conventional UMTS system and basic standardization thereof is currently underway in the 3GPP. The E-UMTS may be generally referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, eNBs (or eNode Bs or base stations) 110a and 110b, and an Access Gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

DISCLOSURE

Technical Problem

An object of the present invention devised to solve the problem lies in providing a method and apparatus for determining the size of a transport block transmitted by a base station to a relay node in a radio communication system.

Technical Solution

The object of the present invention can be achieved by providing a method for receiving a Relay node dedicated Physical Downlink Shared Channel (R-PDSCH) from a base station by a relay node in a radio communication system, including receiving, from the base station, a Modulation and Coding Scheme (MCS) index and the number $N^{R\text{-}PDSCH}_{PRB1}$ of first resource blocks to which the R-PDSCH is transmitted, under the assumption that a Relay node dedicated Physical Downlink Control Channel (R-PDCCH) is not transmitted, estimating the number $N^{R\text{-}PDSCH}_{PRB2}$ of second resource blocks to which the R-PDSCH is actually transmitted, using the number $N^{R\text{-}PDSCH}_{PRB1}$ of the first resource blocks and using the number $N^{R\text{-}PDCCH}_{PRB}$ of resource blocks to which the R-PDCCH is transmitted, selecting the size of a transport block mapped to the R-PDSCH, using the number $N^{R\text{-}PDSCH}_{PRB2}$ of the second resource blocks and using a transport block index corresponding to the MCS index, and decoding the R-PDSCH, using the size of the transport block and using a modulation order corresponding to the MCS index.

The estimating of the number $N^{R\text{-}PDSCH}_{PRB2}$ of the second resource blocks may be performed based on the following Equation 1:

$$N^{R\text{-}PDSCH}_{PRB2} = N^{R\text{-}PDSCH}_{PRB1} - \lfloor N^{R\text{-}PDCCH}_{PRB} \cdot \alpha_i \rfloor \quad \text{[Equation 1]}$$

(where $N^{R\text{-}PDSCH}_{PRB1}$ is the number of the first resource blocks, $N^{R\text{-}PDSCH}_{PRB2}$ is the number of the second resource blocks, $N^{R\text{-}PDCCH}_{PRB}$ is the number of the resource blocks to which the R-PDCCH is transmitted, and $\alpha_i$ is an arbitrary value between 0 and 1).

The estimating of the number $N^{R\text{-}PDSCH}_{PRB2}$ of the second resource blocks may include excluding the number of resource blocks corresponding to last symbols in a backhaul subframe transmitted from the base station to the relay node from the number of the first resource blocks. The estimating of the number $N^{R\text{-}PDSCH}_{PRB2}$ of second resource blocks may be performed based on the following Equation 2:

$$N^{R\text{-}PDSCH}_{PRB2} = (N^{R\text{-}PDSCH}_{PRB1} - \lfloor N^{R\text{-}PDCCH}_{PRB} \cdot \alpha_i \rfloor) \cdot (1-\beta) \quad \text{[Equation 2]}$$

(where $N^{R\text{-}PDSCH}_{PRB1}$ is the number of the first resource blocks, $N^{R\text{-}PDSCH}_{PRB2}$ is the number of the second resource blocks, $N^{R\text{-}PDCCH}_{PRB}$ is the number of the resource blocks to which the R-PDCCH is transmitted, $\alpha_i$ is an arbitrary value between 0 and 1, and $\beta$ is the inverse of the number of available symbols of the backhaul subframe).

In another aspect of the present invention, provided herein is a method for receiving a Relay node dedicated Physical Downlink Shared Channel (R-PDSCH) from a base station by a relay node in a radio communication system, including receiving, from the base station, a first modulation order $Q_{m1}$ and the size $TBS_1$ of a first transport block transmitted through the R-PDSCH, under the assumption that a Relay node dedicated Physical Downlink Control Channel (R-PDCCH) is not transmitted, calculating an effective code rate k, using the first modulation order $Q_{m1}$, the size $TBS_1$ of the first transport block, and the number $N_{RE1}$ of effective resource elements when the R-PDCCH is not transmitted, estimating the size $TBS_2$ of a second transport block so as to corresponding to the effective code rate k, using the number $N_{RE2}$ of effective resource elements when the R-PDCCH is transmitted and a second modulation order $Q_{m2}$, and decoding the R-PDSCH, using the size $TBS_2$ of the second transport block and the second modulation order $Q_{m2}$.

The effective code rate k may be defined by the following Equation 3:

$$\frac{TBS_1}{N_{RE1} \cdot Q_{m1}} = k \quad \text{[Equation 3]}$$

(where $N_{RE1}$ is the number of the effective resource elements when the R-PDCCH is not transmitted, $Q_{m1}$ is the first modulation order, and $TBS_1$ is the size of the first transport block).

The size $TBS_2$ of the second transport block may be estimated by the following Equation 4:

$$\frac{TBS_1}{N_{RE1} \cdot Q_{m1}} (N_{RE2} \cdot Q_{m2}) = TBS_2 \quad \text{[Equation 4]}$$

(where $N_{RE2}$ is the number of the effective resource elements when the R-PDCCH is transmitted, $Q_{m2}$ is the second modulation order, and $TBS_2$ is the size of the second transport block).

In a further aspect of the present invention, provided herein is a relay apparatus in a radio communication system, including a receiving module for receiving, from a base station, a Modulation and Coding Scheme (MCS) index and the number $N^{R\text{-}PDSCH}_{PRB1}$ of first resource blocks to which a Relay apparatus dedicated Physical Downlink Shared Channel (R-PDSCH) is transmitted, under the assumption that a Relay apparatus dedicated Physical Downlink Control Channel (R-PDCCH) is not transmitted, and a processor for estimating the number $N^{R\text{-}PDSCH}_{PRB2}$ of second resource blocks to which the R-PDSCH is actually transmitted, using the number $N^{R\text{-}PDSCH}_{PRB1}$ of the first resource blocks and using the number $N^{R\text{-}PDCCH}_{PRB}$ of resource blocks to which the R-PDCCH is transmitted, selecting the size of a transport block mapped to the R-PDSCH, using the number $N^{R\text{-}PDSCH}_{PRB2}$ of the second resource blocks and using a transport block index corresponding to the MCS index, and decoding the R-PDSCH, using the size of the transport block and using a modulation order corresponding to the MCS index.

In another aspect of the present invention, provided herein is a relay apparatus in a radio communication system, including a receiving module for receiving, from a base station, a first modulation order $Q_{m1}$ and the size $TBS_1$ of a first transport block transmitted through a Relay apparatus dedicated Physical Downlink Shared Channel (R-PDSCH), under the assumption that a Relay apparatus dedicated Physical Downlink Control Channel (R-PDCCH) is not transmitted, and a processor for calculating an effective code rate k, using the first modulation order $Q_{m1}$, the size $TBS_1$ of the first transport block, and the number $N_{RE1}$ of effective resource elements when the R-PDCCH is not transmitted, estimating the size $TBS_2$ of a second transport block so as to corresponding to the effective code rate k, using the number $N_{RE2}$ of effective resource elements when the R-PDCCH is transmitted and a second modulation order $Q_{m2}$, and decoding the R-PDSCH, using the size $TBS_2$ of the second transport block and the second modulation order $Q_{m2}$.

Advantageous Effects

According to exemplary embodiments of the present invention, a base station may effectively determine the size of a transport block transmitted to a relay node in a radio communication system.

It is to be understood that the advantages that can be obtained by the present invention are not limited to the aforementioned advantage and other advantages which are not mentioned will be apparent from the following description to the person with an ordinary skill in the art to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings.

Although the embodiments of the present invention are described based on the LTE system and the LTE Advanced (LTE-A) system, the embodiments of the present invention are applicable to any communication system corresponding to the aforementioned definition. In addition, although the embodiments of the present invention are described based on a Frequency Division Duplex (FDD) scheme as an example, the embodiments of the present invention may be easily modified and applied to a Half-Duplex FDD (H-FDD) scheme or a Time Division Duplex (TDD) scheme.

Figure 1:
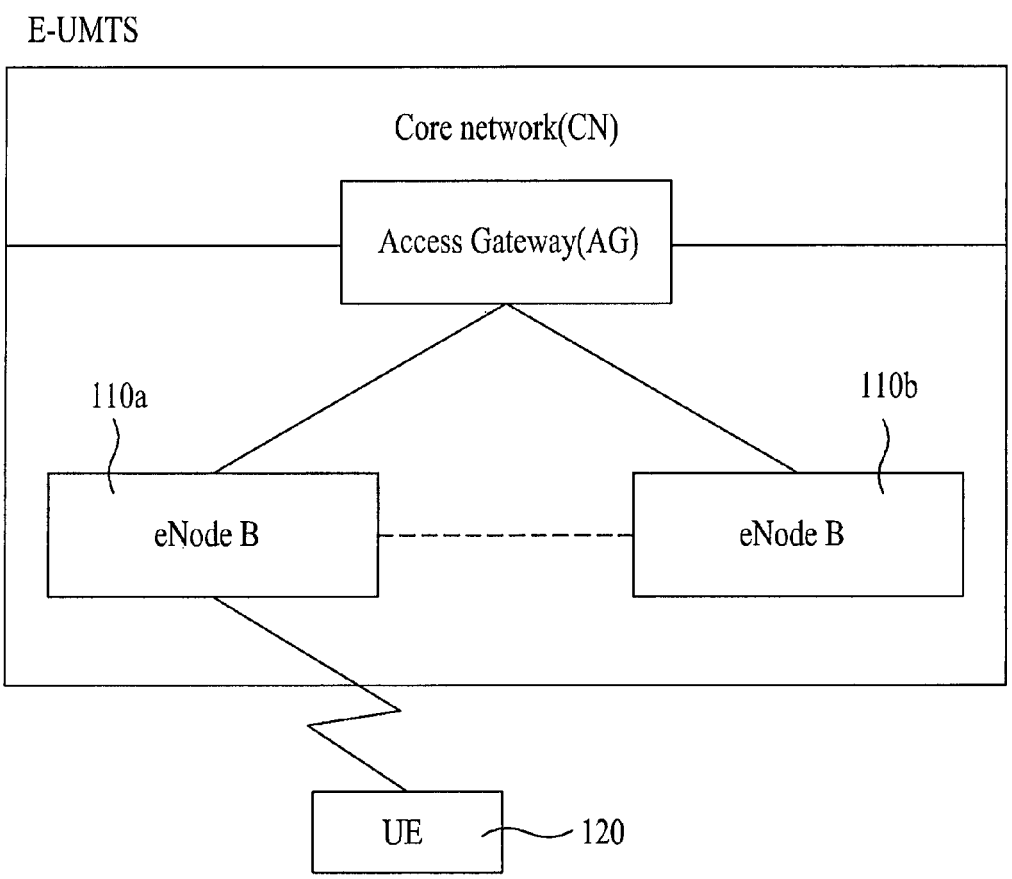
FIG. 1 is a diagram schematically showing a network structure of an E-UMTS as an exemplary radio communication system.
Figure 2:
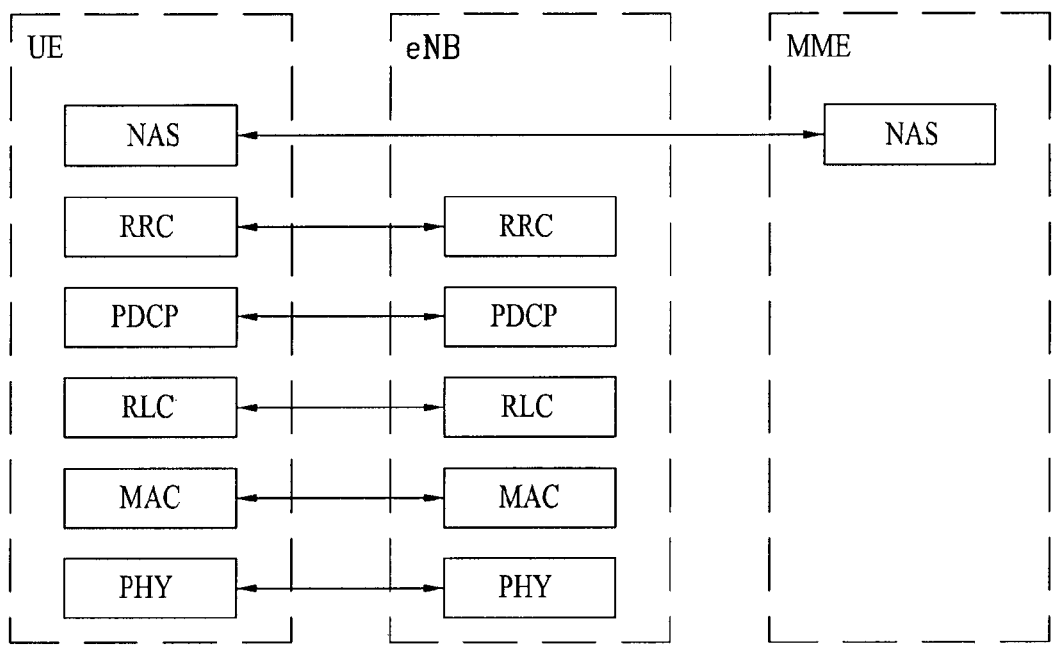
FIG. 2 is a diagram showing structures of a control plane and a user plane of a radio interface protocol between a UE and E-UTRAN based on the 3GPP radio access network standard.
Figure 2:
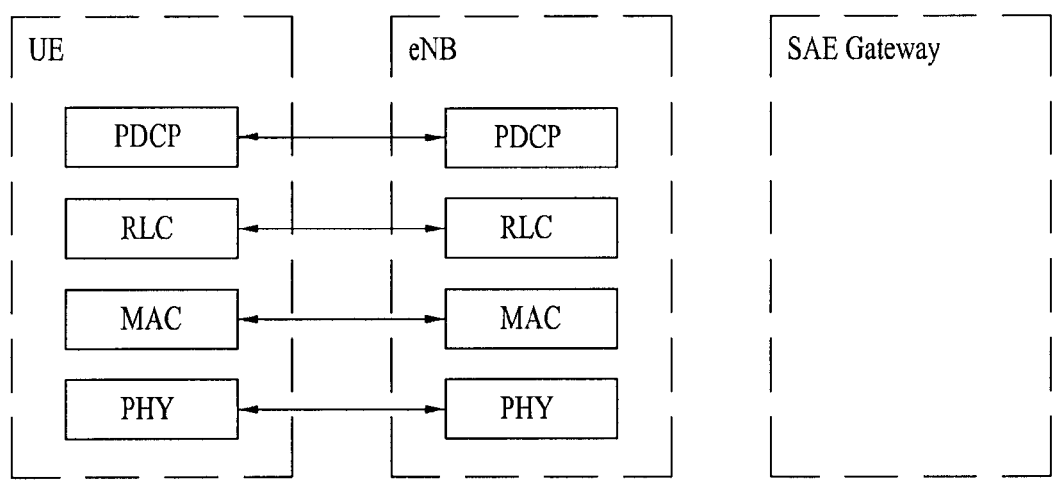

FIG. 2 is a diagram showing structures of a control plane and a user plane of a radio interface protocol between a UE and E-UTRAN based on the 3GPP radio access network standard. The control plane refers to a path used for transmitting control messages which are used in the UE and the network to manage a call. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer of an upper layer via a transport channel. Data is transported between the MAC layer and the PHY layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as IPv4 or IPv6 in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. User traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
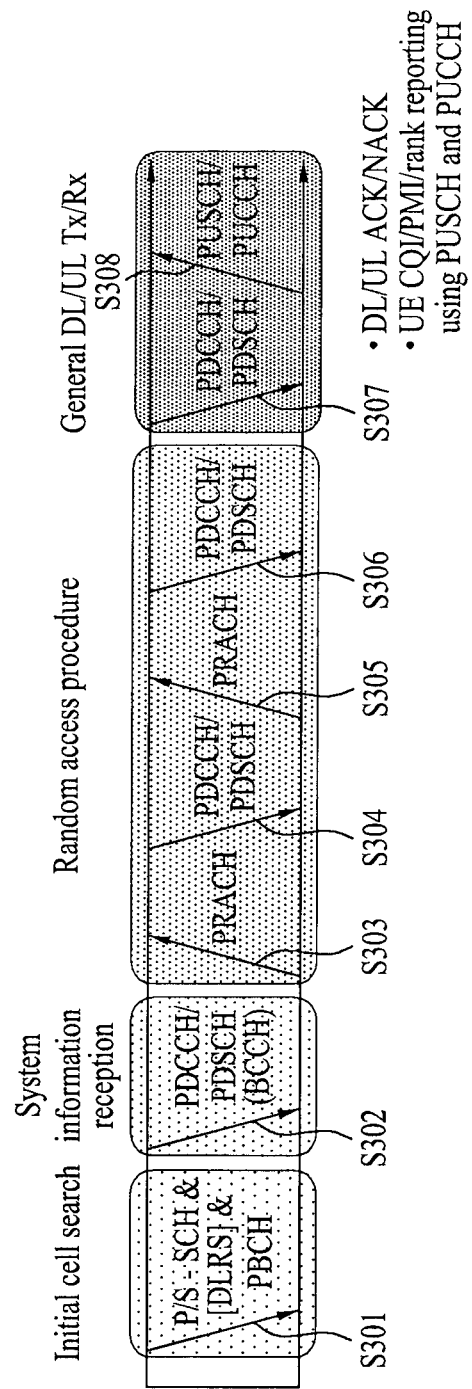
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. The UE receives Downlink Control Information (DCI) through the PDCCH. The DCI includes control information such as resource allocation to the UE and has different formats according to a use purpose.

Meanwhile, control information transmitted by the UE to the eNB through uplink or received by the UE from the eNB through downlink includes a downlink/uplink Acknowledgement/Negative Acknowledgement (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
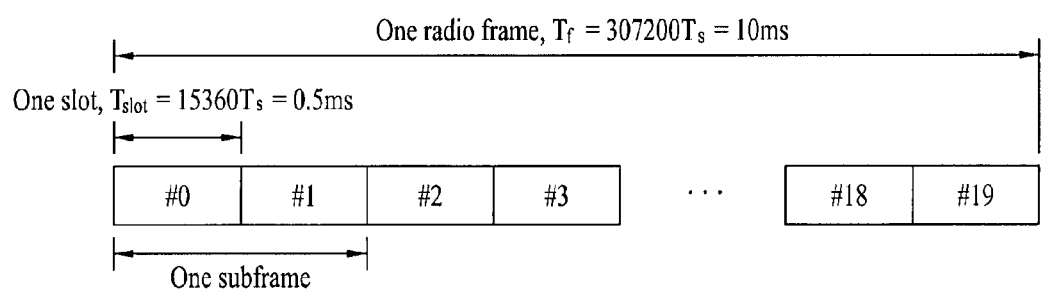
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (3027200*Ts) and includes 10 subframes each having the same size. Each of the subframes has a length of 1 ms and includes two slots. Each of the slots has a length of 0.5 ms (15360 $T_s$). In this case, $T_s$ denotes a sampling time, and is represented by $T_s=1/(15\ kHz\times2048)=3.2552\times10^{-8}$ (about 33 ns). Each slot includes a plurality of OFDM symbols in a time domain and includes a plurality of Resource Blocks (RBs) in a frequency domain. In the LTE system, one RB includes 12 subcarriers×7 (or 6) OFDM symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
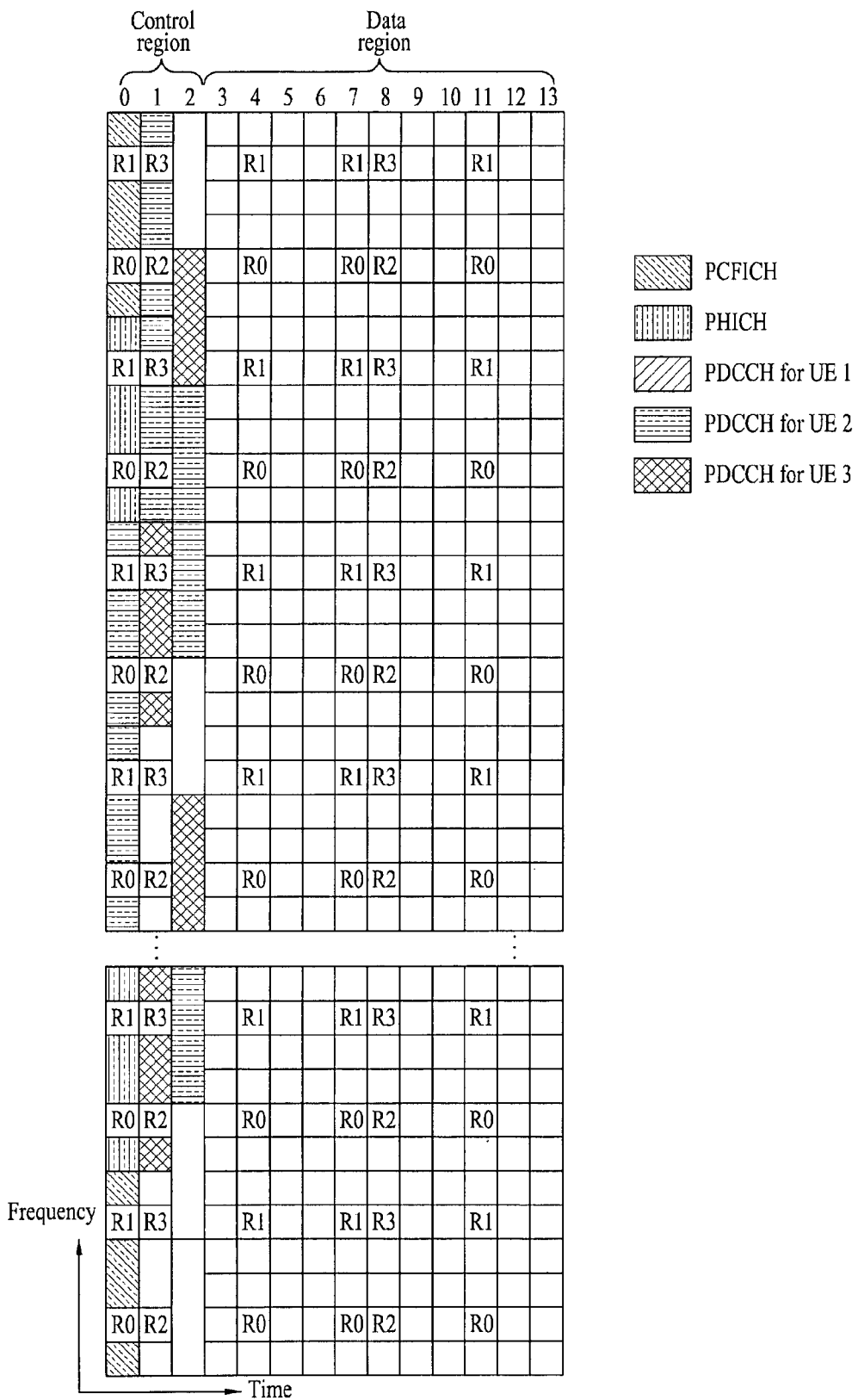
FIG. 5 is a diagram showing a control channel contained in a control region of one subframe in a downlink radio frame.

FIG. 5 is a diagram showing a control channel contained in a control region of one subframe in a downlink radio frame.

Referring to FIG. 5, one subframe includes 14 OFDM symbols. First to third ones of the 14 OFDM symbols may be used as a control region and the remaining OFDM symbols (i.e., 13 to 11 OFDM symbols) may be used as a data region, according to subframe setting. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources, to which the RS is not allocated, in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier× one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs. PDSCH data is transmitted, information indicating how UEs receive PDSCH data, and information indicating how UEs perform decoding are contained in the PDCCH. For example, it is assumed that a specific PDCCH is CRC-masked with a Radio Network Temporary Identity (RNTI) 'A', and information about data, that is transmitted using radio resources 'B' (e.g., a frequency location) and transport format information 'C' (e.g., a transmission block size, a modulation scheme, coding information, etc.), is transmitted through a specific subframe. In this case, UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
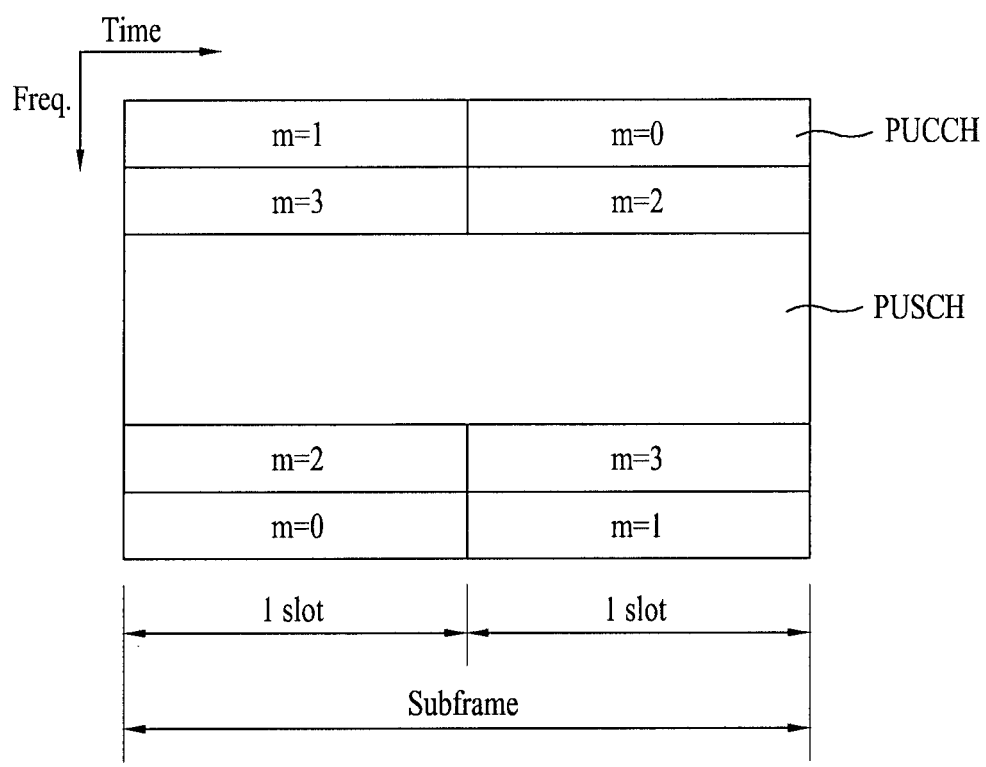
FIG. 6 is a diagram showing the structure of an uplink subframe used in an LTE system.

FIG. 6 is a diagram showing the structure of an uplink subframe used in an LTE system.

Referring to FIG. 6, the uplink subframe may be divided into an area to which a Physical Uplink Control Channel (PUCCH) for transmitting control information is allocated and an area to which a Physical Uplink Shared Channel (PUSCH) for transmitting user data is allocated. A middle portion of the subframe is allocated to the PUSCH, and both portions of a data area in a frequency domain are allocated to the PUCCH. The control information transmitted through the PUCCH includes an ACK/NACK signal used for HARQ, a CQI indicating a downlink channel state, an RI for MIMO, a Scheduling Request (SR) indicating an uplink resource allocation request, and the like. The PUCCH for one UE uses one RB occupying different frequencies at each slot within a subframe. That is, 2 RBs allocated to the PUCCH are frequency-hopped at a slot boundary. FIG. 6 illustrates allocation of PUCCH having m=0, PUCCH having m=1, PUCCH having m=2, and PUCCH having m=3 to a subframe.

Meanwhile, in order to decode data transmitted through the PDSCH, a UE should determine the modulation order and Transport Block Size (TBS). To this end, the UE, reads fields of a 5-bit Modulation and Coding Scheme (MCS) index $I_{MCS}$ contained in a Downlink Control Information (DCI) transmitted through the PDCCH. One field of $I_{MCS}$ is mapped, as listed in the following Table 1, to one modulation order $Q_m$ and one $I_{TBS}$ (where $I_{TBS}$ is one of factor determining the TBS).

TABLE 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |

TABLE 1-continued

| MCS Index $I_{MCS}$ | Modulation Order $Q_m$ | TBS Index $I_{TBS}$ |
|---|---|---|
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The UE omits decoding of a transport block in initial transmission if an effective channel code rate is higher than 0.930, and informs an upper layer that decoding of a transport block has failed. The effective channel code rate may be defined as a value obtained by dividing the number of downlink information bits (including CRC bits) by the number of physical channel bits transmitted on the PDSCH.

The TBS is defined by $I_{TBS}$ and the number $N_{PRB}$ of RBs allocated, as listed in the following Table 2.

TABLE 2

| $I_{TBS}$ | $N_{PRB}$ 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| $I_{TBS}$ | $N_{PRB}$ 11 | 12 | 13 | 14 | 15 | 16 | 17 | 18 | 19 | 20 |
|---|---|---|---|---|---|---|---|---|---|---|
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |

TABLE 2-continued

| $I_{TBS}$ | | | | | | | | | |
|---|---|---|---|---|---|---|---|---|---|
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12576 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

TABLE 2-continued

| $I_{TBS}$ | \multicolumn{10}{c}{$N_{PRB}$} |
| --- | --- | --- | --- | --- | --- | --- | --- | --- | --- | --- |
| | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |

| $I_{TBS}$ | \multicolumn{10}{c}{$N_{PRB}$} |
| --- | --- | --- | --- | --- | --- | --- | --- | --- | --- | --- |
| | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 15264 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 21384 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |

| $I_{TBS}$ | \multicolumn{10}{c}{$N_{PRB}$} |
| --- | --- | --- | --- | --- | --- | --- | --- | --- | --- | --- |
| | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |

TABLE 2-continued

| | | | | | | | | | | |
|---|---|---|---|---|---|---|---|---|---|---|
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 18336 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15840 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 48936 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |

TABLE 2-continued

| | \multicolumn{10}{c}{$N_{PRB}$} |
|---|---|---|---|---|---|---|---|---|---|---|
| $I_{TBS}$ | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

| | \multicolumn{10}{c}{$N_{PRB}$} |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

Meanwhile, when a channel state between an eNB and a UE is poor, a relay node may be installed therebetween to provide a radio channel having a better channel state to the UE. In addition, a high rate data channel may be provided and a cell service area may be enlarged by introducing the relay node in a cell boundary area having an inferior channel state. Thus, the relay node is currently widely used as a technique introduced to solve a propagation shadow zone in a radio communication system.

The past relay node technique was limited to the function of a repeater which simply amplifies signals and transmits the amplified signals, whereas the recent technique has developed into a more intelligent form. Furthermore, the relay node technique is indispensible in decreasing extension costs of an eNB and maintenance costs of a backhaul network, and simultaneously in enlarging service coverage and improving data throughput in future mobile communication systems. As the relay node technique has gradually developed, it is necessary to support a relay node, which is used in a conventional radio communication system, through a new radio communication system.

Figure 7:
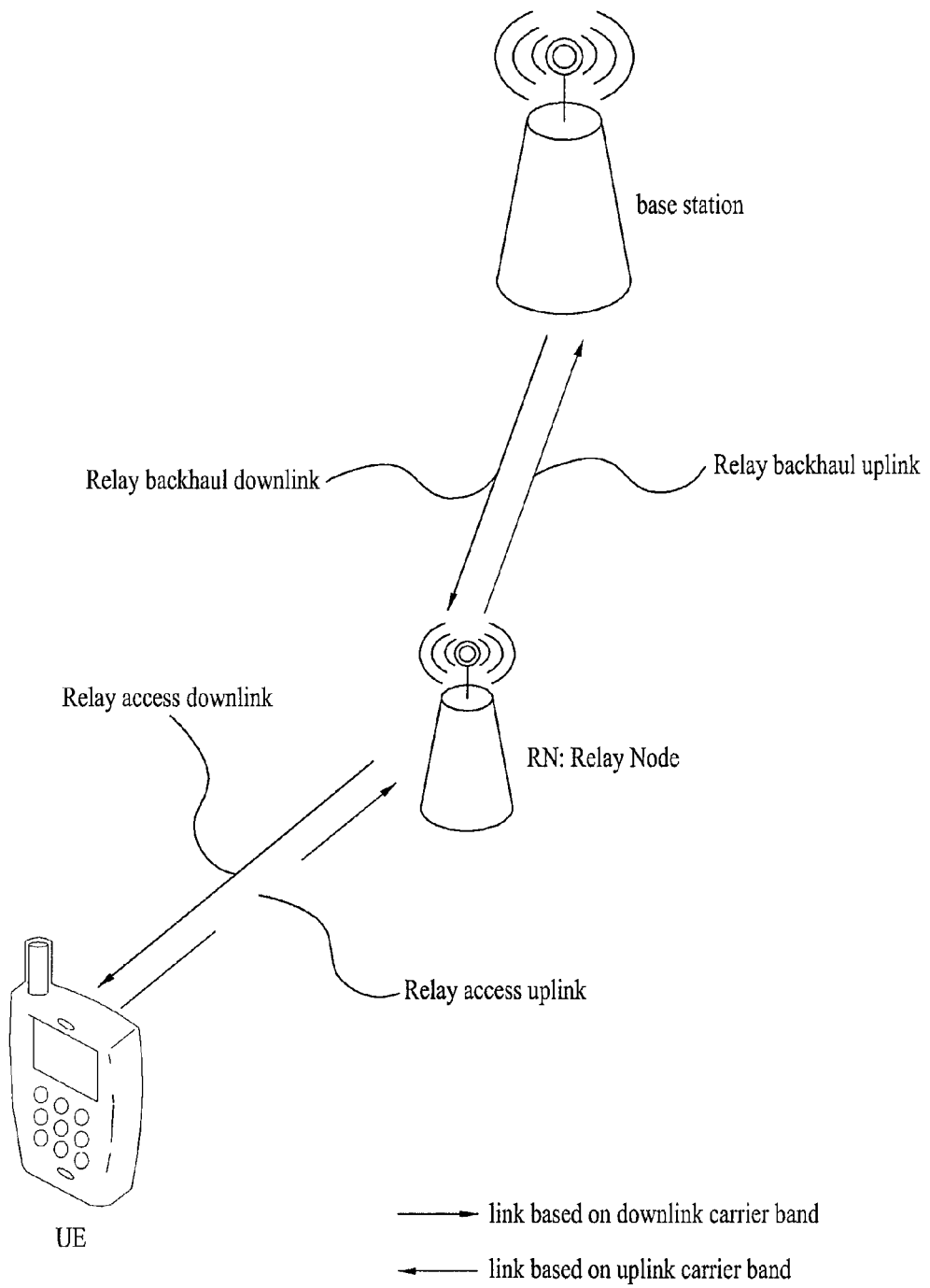
FIG. 7 is a diagram showing the configuration of relay backhaul links and relay access links in a radio communication system.

FIG. 7 is a diagram showing the configuration of relay backhaul links and relay access links in a radio communication system.

Referring to FIG. 7, in a 3GPP LTE-A system, two types of links having different attributes are applied to uplink and downlink carrier frequency bands while introducing a role of forwarding a link connection between the eNB and the UE to the relay node. A connection link part established between links of the eNB and the relay node is defined as a backhaul link. Transmission of the backhaul link by a FDD or TDD scheme using downlink resources may be expressed as a backhaul downlink, and transmission by an FDD or TDD scheme using uplink resources may be expressed as a backhaul uplink.

Meanwhile, a connection link part established between a relay node and a series of UEs is defined as a relay access link. Transmission of the relay access link using a downlink frequency band (in the case of FDD) or downlink subframe (in the case of TDD) resources may be expressed as an access downlink, and transmission using an uplink frequency band (in the case of FDD) or uplink subframe (in the case of TDD) resources may be expressed as an access uplink.

The relay node may receive information from an eNB through a relay backhaul downlink and may transmit information to the eNB through a relay backhaul uplink. Further, the relay node may transmit information to the UE through a relay access downlink and may receive information from the UE through a relay access uplink.

In relation to the use of a bandwidth (or spectrum) of the relay node, the case where the backhaul link operates in the same frequency band as the access link is referred to as inband, and the case where the backhaul link operates in different frequency bands from the access link is referred to as outband. In both the inband and the outband, UEs operating according to the existing LTE system (e.g., Release-8), which will be referred to as legacy UEs, should be able to access a donor cell.

The relay node may be classified into a transparent relay node and a non-transparent relay node depending on whether or not the UE recognizes the relay node. In the transparent relay node, the UE is not aware that it is communicating with a network via the relay node, and in the non-transparent relay node, the UE is aware that it is communicating with the network via the relay node.

In relation to control of the relay node, the relay node may be divided into a relay node as part of a donor cell and a relay node for controlling a cell of its own.

The relay node as part of the donor cell may have a relay node ID but does not have a cell ID of its own. If at least part of Radio Resource Management (RRM) is controlled by an eNB to which the donor cell belongs (while parts of the RRM may be located in the relay node), this may be called a relay node as part of the donor cell. Desirably, such a relay node may support legacy UEs. Smart repeaters, decode-and-forward relays, different types of L2 (second layer) relay nodes, and type-2 relay nodes are examples of this type of relay node.

In the case where a relay node is in control of its own cells, the relay node controls one or several cells and a unique physical-layer cell ID is provided to each of the cells controlled by the relay node. The same RRM mechanism is available and in terms of the UE there is no difference in accessing cells controlled by a relay node and cells controlled by a normal eNB. The cells controlled by the relay node may support the legacy UEs. Self-backhauling relay nodes, L3 (third layer) relay nodes, type-1 relay nodes, and type-1a relay nodes are examples of this type of relay node.

A type-1 relay node is an inband relay node and controls a plurality of cells, each of which appears as a separate cell, distinct from the donor cell, to UEs. The plurality of cells has its own physical cell ID (defined in LTE Release-8) and the relay node may transmit its own synchronization channels, reference signals, etc. In the context of single-cell operation, the UE may receive scheduling information and HARQ feedback directly from the relay node and may transmit its own control channels (SR, CQI, ACK/NACK, etc.) to the relay node. The type-1 relay node appears as a legacy eNB (an eNB operating according to LTE Release-8) to legacy UEs (UEs operating according to LTE Release-8). Namely, the type-1 relay node has backward compatibility. Meanwhile, to UEs operating according to an LTE-A system, the type-1 relay node appears as an eNB different from the legacy eNB to allow for performance enhancement.

A type-1a relay node has the same characteristics as the above-mentioned type-1 relay node except that it operates in outband. The operation of the type-1a relay node may be configured to minimize an influence on the operation of an L1 (first layer) or to eliminate such influence.

A type-2 relay node, which is an inband relay node, does not have a separate physical cell ID and thus does not create any new cells. The type-2 relay node is transparent to the legacy UEs, and the legacy UEs are not aware of the presence of the type-2 relay node. The type-2 relay node may transmit a PDSCH but does not transmit a Common Reference Signal (CRS) and a PDCCH.

Meanwhile, in order to allow inband operation of the relay node, some resources in the time-frequency space should be reserved for the backhaul link and may be set not to be used for the access link. This is called resource partitioning.

A general principle for resource partitioning in the relay node is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay node and uplink subframes of the eNB and relay node, respectively.

In the case of an inband relay node, for example, if reception of the backhaul downlink from the eNB and transmission of the access downlink to the UE are simultaneously performed in a predetermined frequency band, a signal transmitted from a transmitting end of the relay node may be received in a receiving end of the relay node and thus signal interference or Radio Frequency (RF) jamming may occur at an RF front end of the relay node. Similarly, if reception of the access uplink from the UE and transmission of the backhaul uplink to the eNB are simultaneously performed in a predetermined frequency band, signal interference may occur at the RF front end of the relay node. Accordingly, in the relay node, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installing them above/below ground)).

One method for solving the problem of signal interference is to allow the relay node not to transmit a signal to UEs while receiving a signal from the donor cell. That is, a gap may be generated in transmission to the UEs from the relay node and the UEs (including the legacy UEs) may be set not to expect any transmission from the relay node during the gap. Such a gap may be set by configuring a Multicast Broadcast Single Frequency Network (MBSFN) subframe.

Figure 8:
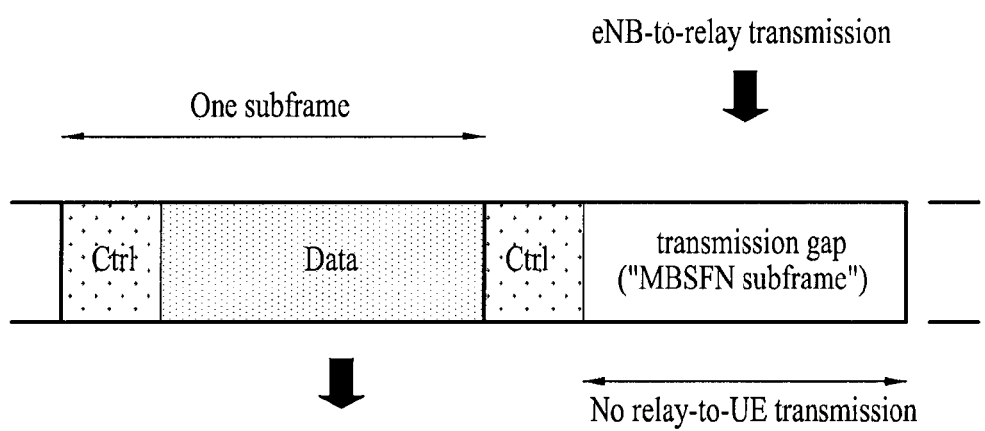
FIG. 8 is a diagram showing relay node resource partitioning.

FIG. 8 is a diagram showing relay node resource partitioning.

In FIG. 8, a first subframe is a general subframe and, in the first subframe, downlink (i.e., access downlink) control signals and data are transmitted to the UE from the relay node. A second subframe is an MBSFN subframe. Control signals are transmitted to the UE from the relay node in a control region of a downlink subframe but no transmission is performed from the relay node to the UE in the other regions of the downlink subframe. In this case, since legacy UEs expect transmission of a PDCCH in all downlink subframes (in other words, since the relay node requires support for legacy UEs within its region to receive the PDCCH every subframe and to perform a measurement function), it is necessary to transmit the PDCCH in all downlink subframes, for correct operation of the legacy UEs. Accordingly, even in a subframe established for transmission of a downlink (i.e., backhaul downlink) to the relay node from the eNB, the relay node needs to transmit the access downlink in the first N (where N=1, 2, or 3) OFDM symbol intervals rather than to receive the backhaul downlink. With regard to this, since the PDCCH is transmitted to the UE from the relay node in the control region of the second subframe, backward compatibility for the legacy UEs served by the relay node may be provided. In the other regions of the second subframe, the relay node may receive transmission from the eNB while no transmission from the relay node to the UE is performed. Through such a resource partitioning scheme, transmission of the access downlink and reception of the backhaul downlink in the inband relay node may not be simultaneously performed.

The second subframe using the MBSFN is described in more detail. The control region of the second subframe may be called a relay node non-hearing interval. During the relay node non-hearing interval, the relay node does not receive a backhaul downlink signal and transmits an access downlink signal. The relay node non-hearing interval may be set to an interval of 1, 2, or 3 OFDM symbols as described above. In the relay node non-hearing interval, the relay node may carry out transmission of the access downlink to the UE, and in the other intervals, it may receive the backhaul downlink from the eNB. In this case, since the relay node cannot perform simultaneous transmission and reception in the same frequency band, the relay node consumes time to change from a transmission mode to a reception mode. Accordingly, a guard time is needed to switch the transmission/reception mode in the first partial interval of a reception region of the backhaul downlink. Similarly, the guard time for switching the transmission/reception mode of the relay node may be set even when the relay node receives the backhaul downlink from the eNB and transmits the access downlink to the UE. The length of the guard time may be given as a value of a time domain, as k (where k≥1) time samples (Ts), or as a length of one or more OFDM symbols. Alternatively, if the relay node backhaul downlink subframes are successively established, or according to a timing alignment relationship of a prescribed subframe, the guard time of the last part of the subframe may be defined or not be established. The guard time may be defined only in a frequency domain which is established for transmission of the backhaul downlink subframe in order to maintain backward compatibility. (If the guard time is established in the access downlink interval, legacy UEs cannot be supported). In the backhaul downlink reception interval except for the guard time, the relay node may receive the PDCCH and PDSCH from the eNB. This may be expressed as Relay-PDCCH (R-PDCCH) and Relay-PDSCH (R-PDSCH) indicating relay node dedicated physical channels.

Figure 9A:
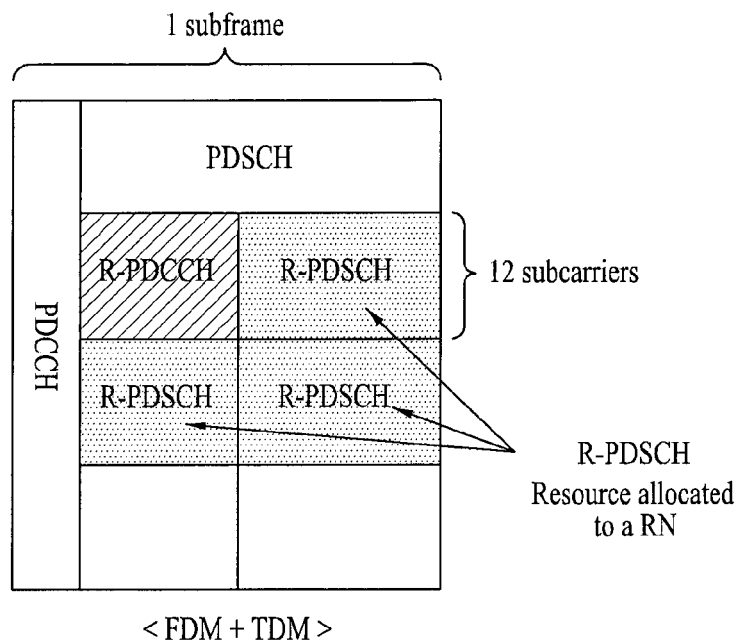
FIGS. 9A and 9B are diagrams showing examples in which an R-PDCCH and an R-PDSCH are multiplexed when a plurality of resources blocks is present.
Figure 9B:
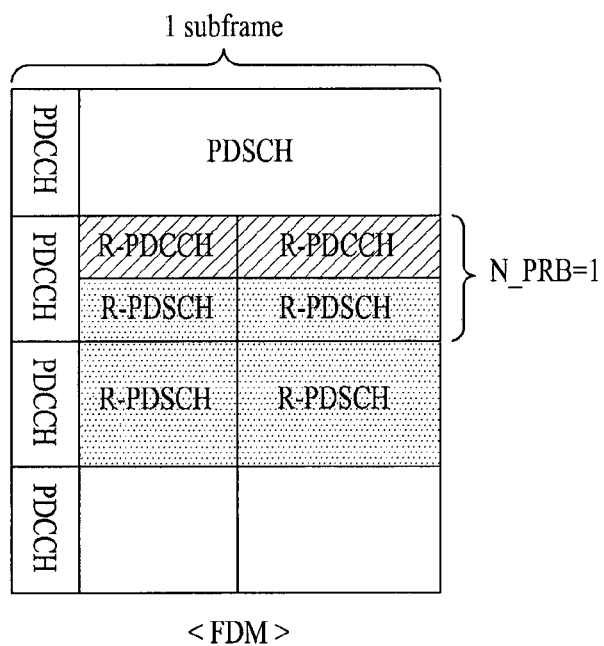

The R-PDCCH and the R-PDSCH may be multiplexed using various methods in links between the eNB and the relay node. FIGS. 9A and 9B show examples in which the R-PDCCH and the R-PDSCH are multiplexed when a plurality of resources blocks is present.

In the LTE-A system, a backhaul subframe is comprised of less symbols than a normal subframe. In addition, since there is a possibility that the backhaul subframe may be designed to use part of symbols or entire symbols in a specific resource block for transmission of the R-PDCCH as shown in FIGS. 9A and 9B, it is difficult to apply conventional MCS and TBS determination methods. If the conventional MCS and TBS determination methods are used without modification, a code rate may be abnormally increased. As described earlier, if an effective code rate exceeds 0.930, since the relay node may omit decoding of a transport block during initial transmission, an existing system may be greatly influenced.

Accordingly, the present invention proposes a method for determining an MCS and a TBS used during data decoding by a relay node side, when usable resources are reduced due to additional overhead (e.g., an R-PDCCH or an additional RS) in addition to existing overhead such as backhaul links between an eNB and a relay node.

If the eNB desires to transmit a transport block of TBS bits through $N_{PRB}$, Resource Blocks (RBs), since the number of effective Resource Elements (REs) is reduced due to transmission of an R-PDCCH, $N'_{PRB}$ RBs may be needed, rather than $N_{PRB}$ RBs, in order to actually transmit the transport block of TBS bits. If the eNB completes scheduling in consideration of a channel situation, associated resource allocation information is transmitted to the relay node through the R-PDCCH (or PDCCH) and the transmitted information may contain the $N'_{PRB}$ value. In other words, $N'_{PRB}$, which is the number of RBs of a region to which resources are actually allocated, is transmitted instead of $N_{PRB}$, which is the number of RBs when the R-PDCCH is absent. Alternatively, the eNB may use a method for signaling $N_{PRB}$ as in a conventional method and the relay node may calculate $N'_{PRB}$.

Figure 10A:
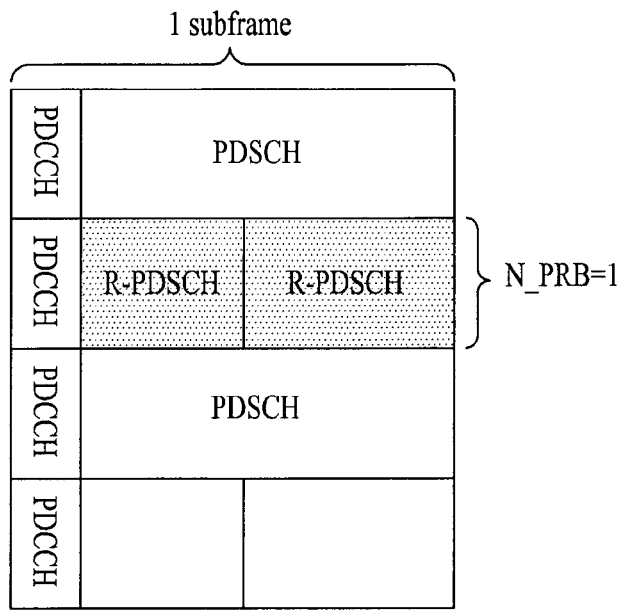
FIGS. 10A and 10B are diagrams explaining a transport block size determination method depending on whether an R-PDCCH is present.
Figure 10B:
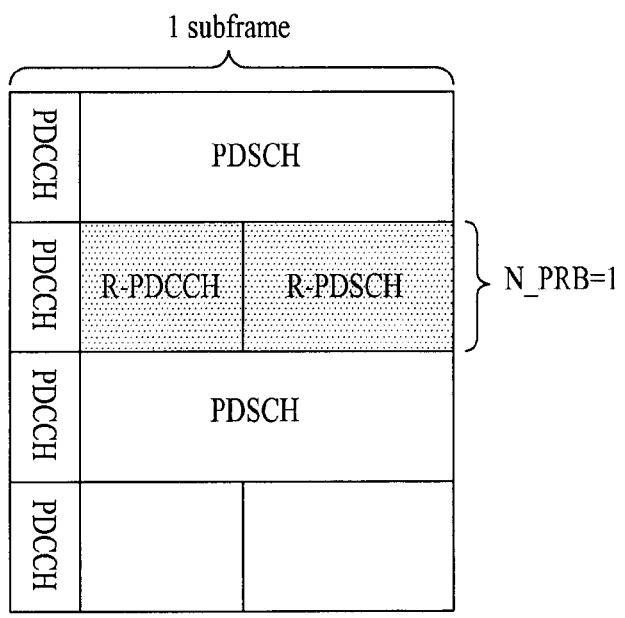

FIGS. 10A and 10B are diagrams explaining a TBS determination method depending on whether an R-PDCCH is present when $N_{PRB}$ is 1.

When the R-PDCCH is not transmitted as shown in FIG. 10A, if a TBS transmitted through an R-PDSCH is 176 bits, it can be seen from Table 1 and Table 2 that the TBS index $I_{TBS}$ is 11, and the MCS index $I_{MCS}$ and the modulation order $Q_m$ corresponding thereto are 12 and 4, respectively. However, if the R-PDCCH is transmitted as shown in FIG. 10B, the actual number of available REs for the R-PDSCH is reduced and REs contained in about two RBs are necessary for transmission of the transport block of the same size.

According to the present invention, $N'_{PRB}$ indicates 2 in the DCI transmitted through the PDCCH. (In Table 2, when $I_{TBS}=11$, $N'_{PRB}=2$, a TBS indicates 376 bits). As described above, since the eNB allocates resources and transmits data using different methods depending on whether or not the R-PDCCH is present, it is desirable to perform decoding considering such resource allocation and data transmission. That is, the relay node should consider the relationship between $N_{PRB}$ and $N'_{PRB}$ when interpreting the signaled $N'_{PRB}$. For example, although R-PDSCH data has been transmitted through $N'_{PRB}$ (=2) RBs (where TBS' corresponding to $N'_{PRB}=2$ is 376 bits), a TBS actually transmitted by the eNB may be interpreted as 176 bits which is a TBS corresponding to a value indicated by $N_{PRB}$. Accordingly, the relay node performs decoding by selecting a TBS corresponding to $N'_{PRB}/2=1$.

As another method, when only one RB is considered, if the number $N_{RE1}$ of available REs is 104 during non-transmission of the R-PDCCH, an effective code rate $$k = \frac{TBS_1}{N_{RE1} \times Q_{m1}} = 176/(104*4) = 0.423 \ (16 \ QAM).$$

However, since the number of available REs is reduced when the R-PDCCH is transmitted, if the eNB desires to transmit the R-PDSCH using only one RB, the eNB may transmit the R-PDSCH to the relay node by selecting the indexes $I_{MCS}$ and $I_{TBS}$ having the same code rate from Table 1 and Table 2.

Namely, when the R-PDCCH is transmitted using one RB, if the number $N_{RE2}$ of available REs is 66, a TBS of $k*(N_{RE2}*Q_{m2})=0.423*(66*2)=55.836$ (QPSK) is transmitted. If the TBS is obtained as a number with decimals or as a value which is not accurately equal to one of the values indicated in Table 2, $I_{TBS}$ may be desirably selected by selecting a value closest to the obtained value. For example, as a TBS which is closest to 55.836 bits, $I_{TBS}=4$ (i.e., 56 bits, QPSK) may be selected in Table 2.

Meanwhile, if it is desired to maintain 16 QAM as a modulation scheme, the eNB may transmit a TBS of 0.423*(66*4)= 0.423*264=111.6 (16 QAM) to the relay node through the R-PDSCH.

This may be expressed by Equation 1 as follows.

$$\frac{TBS_1}{N_{RE1} \times Q_{m1}} = \frac{TBS_2}{N_{RE2} \times Q_{m2}} = k \quad \text{[Equation 1]}$$

In Equation 1, $N_{RE1}$ is the number of REs when the R-PDCCH is absent, $N_{RE2}$ is the number of REs when the R-PDCCH is present, $TBS_1$ is a TBS when the R-PDCCH is absent, $TBS_2$ is a TBS when the R-PDCCH is present, $Q_{m1}$ is a modulation order when the R-PDCCH is absent, and $Q_{m2}$ is a modulation order when the R-PDCCH is present.

In addition, if it is desired to decrease a modulation order, that is, if 16 QAM is changed to QPSK, it is not necessary to maintain a code rate. If the modulation order is decreased, the same performance may be ensured even if the code rate is increased somewhat and thus a higher $I_{TBS}$ may be selected.

Still another method is to use variation in the number of available REs. If $N_{RE1}=104$ and $N_{RE2}=66$, variation in the number of available REs, that is, $N_{RE1}/N_{RE2}=1.58$ may be used. Accordingly, the following Equation 2 may be calculated according to the modulation order.

176/1.58=111.6(16 QAM) or 176/2/1.58=55.7(QPSK)   [Equation 2]

Figure 11A:
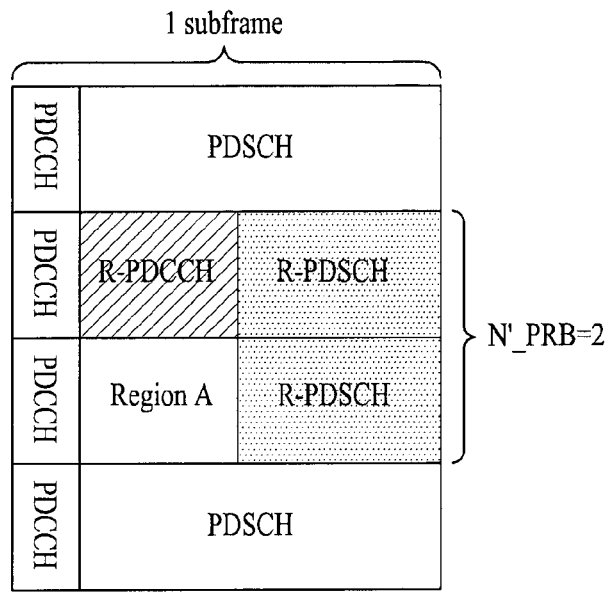
FIGS. 11A and 11B are diagrams explaining a transport block size determination method according to an exemplary embodiment of the present invention.
Figure 11B:
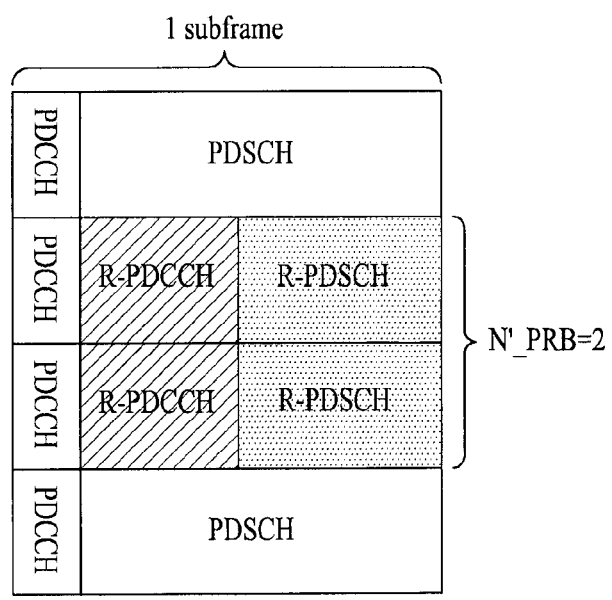

FIGS. 11A and 11B are diagrams explaining a TBS determination method according to an exemplary embodiment of the present invention.

When an R-PDCCH is present as shown in FIG. 11A, a method is proposed for transmitting the R-PDSCH through two RB pairs and maintaining a modulation order $Q_m$ and a TBS as close as possible to values when the R-PDCCH is not transmitted. Namely, if, in FIG. 10A, the modulation order is 16 QAM and the TBS is 176 bits, then in FIG. 11A, the modulation order is maintained at 16 QAM and the TBS is maintained at 176 bits.

In terms of signaling, it is possible to transmit the TBS corresponding to $N'_{PRB}=2$ and $N_{PRB}=1$ and to decode the R-PDCCH throughout the second slot of two RB pairs to a designated modulation order and TBS because a relay node is aware of the location of the R-PDCCH. However, this method has limitations in that RBs for transmitting the R-PDSCH should be allocated in units of 2 RBs.

Meanwhile, if the R-PDCCH is transmitted to only one RB as shown in FIG. 11A, a resource of a region A may be wasted. This may be solved by transmitting the R-PDCCH to the region A as shown in FIG. 11B and may be especially useful when an interleaving unit between R-PDCCHs is a multiple of 2, such as 2, 4, and the like.

Figure 12:
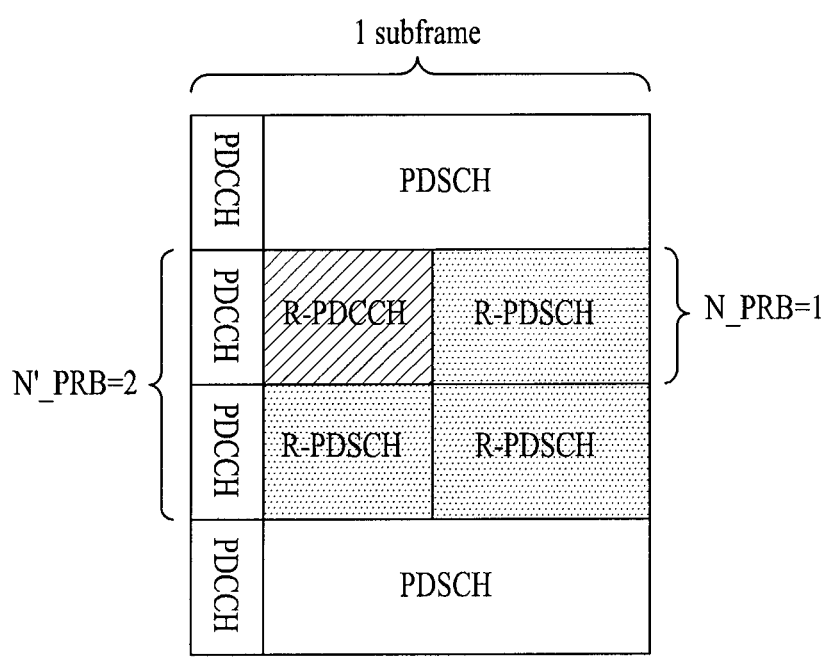
FIG. 12 is a diagram explaining another transport block size determination according to an exemplary embodiment of the present invention.

FIG. 12 is a diagram explaining another TBS determination method according to an exemplary embodiment of the present invention.

A method for transmitting the R-PDSCH is described when the R-PDSCH is changed as shown in FIG. 12 due to transmission of the R-PDCCH while being transmitted to one RB as shown in FIG. 10A. It is assumed that in FIG. 10A the number $N_{RE1}$ of available REs for transmitting the R-PDSCH is 104 and in FIG. 12 the number $N_{RE2}$ of available REs is 170 (=66+104).

To use Table 1 and Table 2, it is desirable to select the greatest $I_{MCS}$ and $I_{TBS}$ within the same code rate as in FIG. 10 and not to change the modulation order if possible.

Hereinafter, a method for calculating a TBS when R-PDSCH regions vary according to the size of the R-PDCCH is described by way of example.

Figure 13:
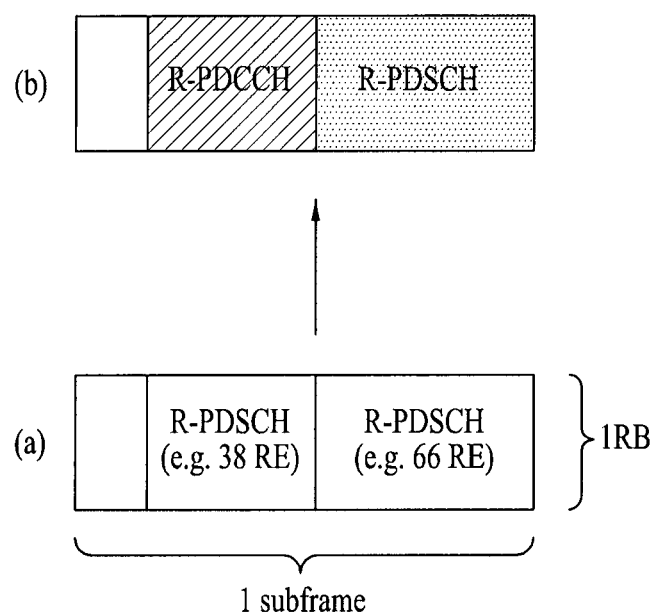
FIG. 13 is a diagram showing variation of an R-PDSCH resource region due to presence of an R-PDCCH when $N_{PRB}$ is 1.

FIG. 13 is a diagram showing variation of an R-PDSCH resource region due to presence of an R-PDCCH when $N_{PRB}$ is 1.

When the R-PDSCH is transmitted as shown in (a) of FIG. 13, a relay node determines the TBS through Table 1 and Table 2 using signaled $I_{TBS}$ and $N_{PRB}$. For example, when $I_{TBS}=11$ and $N_{PRB}=1$, the TBS is 176 bits. Moreover, an effective code rate is determined using the following Table 3. In this case, it is assumed that the number $N_{RE1}$ of available REs is 104.

TABLE 3

Allowable encoded bits = 104(REs)*4(16QAM) = 416[bits] (1RB)
Recommended transport block size (TBS$_1$) = 176 [bits] (I$_{TBS}$ = 11)
Effective code rate = 176/416 = 0.423 (16QAM)

If it is assumed that the modulation order is maintained when the R-PDCCH is present as shown in (b) of FIG. 13, it is desirable in terms of efficient use of resources to calculate, as indicated in Equation 3, a TBS TBS$_2$ using a ratio $k_1$ indicating how many REs are changed. The following Table 4 shows an example of determining the TBS under the assumption that 16QAM is maintained.

$$\frac{N_{RE2}}{N_{RE1}} = k_1 = \frac{TBS_2}{TBS_1} \quad \text{[Equation 3]}$$

TABLE 4

$k_1$ = 66/104 = 0.6346 (63%)
Allowable encoded bits = 66 [REs] * 4 (16QAM) = 264 [bits]
Recommended transport block size (TBS$_2$) = 111 [bits] (=k$_1$ *176 [bits])
Effective code rate = 111/264 = 0.420 (16QAM)

Meanwhile, if the modulation order is not maintained, the TBS TBS$_2$ may be calculated using a ratio $k_2$ by Equation 4.

The following Table 5 shows an example of determining the TBS under the assumption that the modulation order is not maintained.

$$\frac{N_{RE2} \cdot Q_{m2}}{N_{RE1} \cdot Q_{m1}} = k_2 = \frac{TBS_2}{TBS_1} \quad \text{[Equation 4]}$$

TABLE 5

$k_2$ = 66/104 = 0.6346 (63%)
Allowable encoded bits = 66 [REs] * 2 (QPSK) = 132 [bits]
Effective code rate = X/132 = 0.424 (QPSK)
Recommended transport block size X ($TBS_2$) = 56 [bits]

Unlike Table 5, if the code rate is not maintained, k*132=83 bits may be transmitted. However, if the code rate is increased, performance deterioration may occur.

Figure 14:
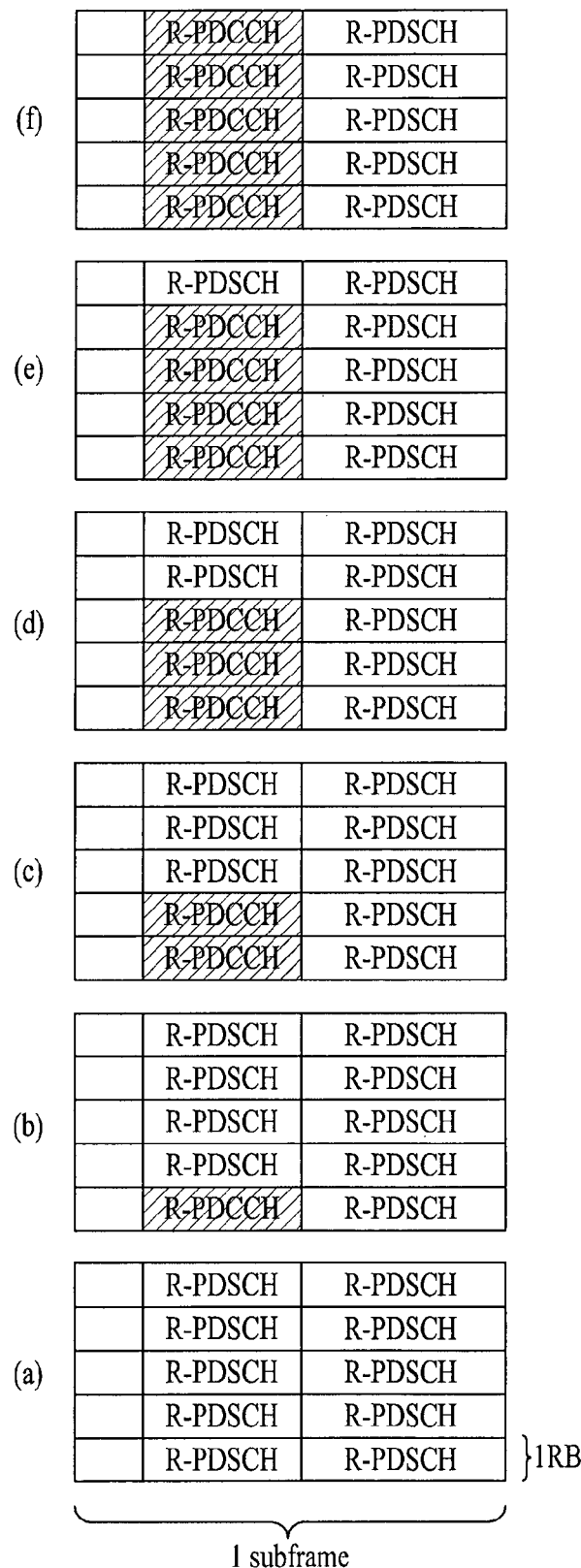
FIG. 14 is a diagram showing variation of an R-PDSCH resource region due to presence of an R-PDCCH when $N_{PRB}$ is 5.

FIG. 14 is a diagram showing variation of an R-PDSCH resource region due to presence of an R-PDCCH when $N_{PRB}$ is 5. Even in FIG. 14, the TBS may be determined using the method described in conjunction with FIG. 13.

For example, in (a) of FIG. 14, when $N_{PRB}$=5 and $I_{TBS}$=17, the TBS is 1800 bits. In this case, an effective code rate may be calculated as indicated in the following Table 6.

Allowable encoded bits = 104 (REs)*5(PRB pairs)*6 (64QAM) = 3120 [bits]
Recommended transport block size ($TBS_1$) = 1800 [bits] ($I_{TBS}$ = 17)
Effective code rate = 1800/3120 = 0.5769 (64QAM)

The TBS in (f) of FIG. 14 may be calculated based on Table 6 as indicated in the following Table 7.

TABLE 7 k = (66*5)/(104*5) = 0.6346 (63%)
Allowable encoded bits = 66 (REs)*5 (RBs) *6 (64QAM) = 1980 [bits]
Recommended transport block size = 1256 [bits] (=k *1980 [bits])
Effective code rate = 1256/1980 = 0.6343 (64QAM)

As a method for determining the TBS using Table 1 and Table 2, if the TBS calculated according to the above proposed methods is not an integer, it is desirable to first make the TBS an integer value using a floor or ceiling function. Alternatively, a real number may be used as itself. Next, if the same value as the calculated TBS is present in Table 2, the value is selected. If the same value is absent, a value closest to the calculated TBS is selected. In this case, the value closest to the calculated TBS may be a value closest to the calculated TBS among values smaller than the calculated TBS or among values larger than the calculated TBS.

In the process of determining the TBS in Table 2, one value may be selected according to the above principle from among values obtained by one-dimensionally arranging all the values in Table 2 (in ascending or descending order). Alternatively, the TBS may be determined according to the above principle based on one of a column or a row from the value in Table 2, that is, from 2-dimensional arrangement. Especially, if the modulation order is changed, it is desirable to fix $N_{PRB}$, that is, to determine the TBS only in a specific column in Table 2.

However, it is noted that the effective code rate should not exceed a specific threshold value. Especially, since decoding is omitted if the code rate is greater than 0.930 in initial transmission, a different code rate is desirably selected.

In the above examples, in the case of obtaining an actual TBS based on the calculated $N_{PRB2}$, the method for selecting a proper TBS from different columns of $N_{PRB}$ under the state that the modulation order is fixed has been described. However, since TBS granularity according to variation in $N_{PRB}$ is relatively larger than variation in a TBS according to variation in $I_{TBS}$, a value different from an optimal TBS may be selected. Accordingly, it is desirable to determine the optimal TBS by varying $I_{TBS}$, TBS granularity of which is small.

For example, an effective code rate is calculated under the assumption of $N_{PRB}$=5 and $I_{TBS}$=17 as indicated in Table 8.

TABLE 8

Allowable encoded bits = 104 (REs)*5(RBs)*6 (64QAM) = 3120 [bits] (5 RB)
Recommended transport block size = 1800 [bits] ($I_{TBS}$ = 17)
Effective code rate = 1800/3120 = 0.5769 (64QAM)

The TBS of the R-PDCCH based on Table 8 is calculated as indicated in Table 9.

TABLE 9 k = (66*5)/(104*5) = 0.6346 (63%):
Allowable encoded bits = 66 (REs) *5 (RBs) *6 (64QAM) = 1980 [bits]
Recommended transport block size = 1256 [bits] (=k *1980 [bits])
Effective code rate = 1256/1980 = 0.6343 (64QAM)

To search for a value closest to the TBS of 1256 calculated in Table 9, a method for searching for a TBS in the same row while maintaining $I_{TBS}$=17 and varying $N_{PRB}$ may be used. That is, a TBS of 1064 bits corresponding to $N_{PRB}$=3 or a TBS of 1416 bits corresponding to $N_{PRB}$=4 as indicated in Table 10 may be selected as the TBS approximate to the calculated TBS of 1256 bits.

Next, a method for searching for a TBS which is closest to the calculated TBS of 1256 bits while varying $I_{TBS}$ under the assumption that the modulation is maintained may be used. Namely, a TBS corresponding to $I_{TBS}$=13 is selected in Table 10 because it is closest to the calculated TBS. It is noted that this method is a method for selecting a value when $I_{TBS}$=13 rather than selecting $I_{TBS}$=13. Accordingly, the MCS index $I_{MCS}$ and the modulation order $Q_m$ are not changed.

TABLE 10

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |

TABLE 10-continued

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

Figure 15:
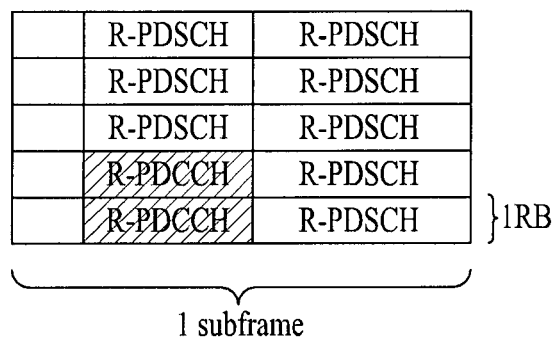
FIGS. 15 and 16 are diagrams explaining TBS determination methods according to another exemplary embodiment of the present invention.
Figure 16:
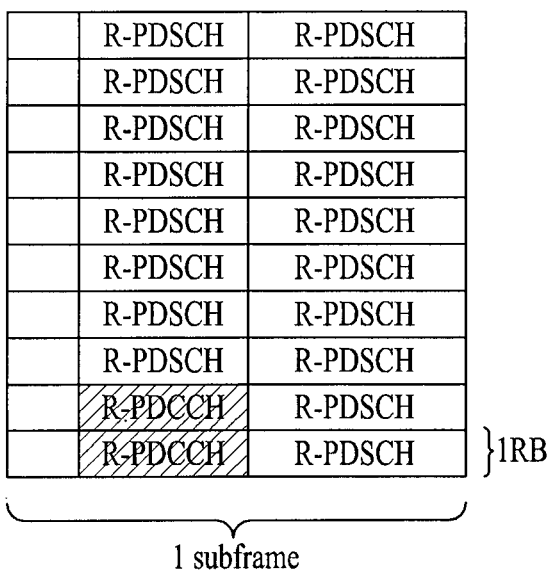

FIGS. 15 and 16 are diagrams explaining TBS determination methods according to another exemplary embodiment of the present invention. In FIGS. 15 and 16, it is assumed that the number of Paired Resource Blocks (RBs) occupied by the R-PDCCH is fixed to 2.

As shown in FIG. 15, if $N_{PRB}=5$, since a region occupied by the R-PDCCH corresponds approximately to one PRB, a TBS when $N_{PRB}=4$ is selected. Similarly, when $N_{PRB}=10$ as shown in FIG. 16, a TBS when $N_{PRB}=9$ is selected. This may be generalized as follows.

$$N_{PRB}(\text{new}) = N_{PRB}(\text{signaled}) - 1 \quad [\text{Equation 5}]$$

If the number of PRBs occupied by the R-PDCCH is one, 1) a method for determining a TBS using $N_{PRB}$ without considering the presence of the R-PDCCH, and 2) a method for determining a TBS to perform decoding using $N_{PRB}-1$ similarly to the case where the number of PRBs occupied by the R-PDCCH is fixed to 2 may be used. This rule may be applied when the number of PRBs occupied by the R-PDCCH is 3 or more and is indicated in the following Table 11 and Table 12. Table 11 and Table 12 may be generalized as expressed in the following Equation 6.

TABLE 11

| $\alpha_i = 0.5$ | | | |
|---|---|---|---|
| Number of newly calculated R-PDSCH PRB pair, $N_{PRB2}^{R-PDSCH}$ | Number of signaled R-PDSCH PRB pair, $N_{PRB1}^{R-PDSCH}$ | Number of R-PDCCH PRB pair, $N_{PRB}^{R-PDCCH}$ | $M_i$ $N_{PRB}^{R-PDCCH} \cdot \alpha_i$ |
| 1 | 1 | 1 | 0 |
| 2 | 2 | 1 | 0 |
| 3 | 3 | 1 | 0 |
| 4 | 4 | 1 | 0 |
| ... | ... | ... | ... |
| 1 | 2 | 2 | 1 |
| 2 | 3 | 2 | 1 |
| 3 | 4 | 2 | 1 |
| 4 | 5 | 2 | 1 |
| 5 | 6 | 2 | 1 |
| ... | ... | ... | ... |
| 2 | 3 | 3 | 1 |

TABLE 11-continued

| $\alpha_i = 0.5$ | | | |
|---|---|---|---|
| Number of newly calculated R-PDSCH PRB pair, $N_{PRB2}^{R-PDSCH}$ | Number of signaled R-PDSCH PRB pair, $N_{PRB1}^{R-PDSCH}$ | Number of R-PDCCH PRB pair, $N_{PRB}^{R-PDCCH}$ | $M_i$ $N_{PRB}^{R-PDCCH} \cdot \alpha_i$ |
| 3 | 4 | 3 | 1 |
| 4 | 5 | 3 | 1 |
| 5 | 6 | 3 | 1 |
| 6 | 7 | 3 | 1 |
| 2 | 4 | 4 | 2 |
| 3 | 5 | 4 | 2 |
| 4 | 6 | 4 | 2 |
| 5 | 7 | 4 | 2 |
| 6 | 8 | 4 | 2 |

TABLE 12

| $\alpha_i = 0.5$ | | | |
|---|---|---|---|
| Number of newly calculated R-PDSCH PRB pair, $N_{PRB2}^{R-PDSCH}$ | Number of signaled R-PDSCH PRB pair, $N_{PRB1}^{R-PDSCH}$ | Number of R-PDCCH PRB pair, $N_{PRB}^{R-PDCCH}$ | $M_i$ $N_{PRB}^{R-PDCCH} \cdot \alpha_i$ |
| 1 | 1 | 1 | 0 |
| 2 | 2 | 1 | 0 |
| 3 | 3 | 1 | 0 |
| 4 | 4 | 1 | 0 |
| ... | ... | ... | ... |
| 2 | 2 | 2 | 0 |
| 3 | 3 | 2 | 0 |
| 4 | 4 | 2 | 0 |
| 5 | 5 | 2 | 0 |
| 6 | 6 | 2 | 0 |
| ... | ... | ... | ... |
| 2 | 3 | 3 | 1 |
| 3 | 4 | 3 | 1 |
| 4 | 5 | 3 | 1 |
| 5 | 6 | 3 | 1 |
| 6 | 7 | 3 | 1 |
| 3 | 4 | 4 | 1 |

TABLE 12-continued $\alpha_i = 0.5$

| Number of newly calculated R-PDSCH PRB pair, $N_{PRB2}^{R\text{-}PDSCH}$ | Number of signaled R-PDSCH PRB pair, $N_{PRB1}^{R\text{-}PDSCH}$ | Number of R-PDCCH PRB pair, $N_{PRB}^{R\text{-}PDCCH}$ | $M_i$ $N_{PRB}^{R\text{-}PDCCH} \cdot \alpha_i$ |
|---|---|---|---|
| 4 | 5 | 4 | 1 |
| 5 | 6 | 4 | 1 |
| 6 | 7 | 4 | 1 |
| 7 | 8 | 4 | 1 |

$$N_{PRB2}^{R\text{-}PDSCH} = N_{PRB1}^{R\text{-}PDSCH} - M_i \quad \text{[Equation 6]}$$

In the above Table 11 and Table 12, M is a value derived from the following Equation 7.

$$N_{PRB2}^{R\text{-}PDSCH} = N_{PRB1}^{R\text{-}PDSCH} - \lceil N_{PRB}^{R\text{-}PDCCH} \cdot \alpha_i \rceil_{(a)}$$

$$N_{PRB2}^{R\text{-}PDSCH} = N_{PRB1}^{R\text{-}PDSCH} - \lfloor N_{PRB}^{R\text{-}PDCCH} \cdot \alpha_i \rfloor_{(b)} \quad \text{[Equation 7]}$$

In Equation 7, for although $\alpha_i$ of a fixed constant value may be used for simple system achievement, it may have a plurality of values to increase resource efficiency. For example, $\alpha_i$ may have a fixed value such as 0.5, 0.6, 0.65, 0.7, or 0.75. In some case, however, $\alpha_i$ may use a variable value between 0 and 1. More specifically, $\alpha_i$ may use a value of a form in which (a) and (b) of Equation 6 are combined to incorporate an effect of the R-PDCCH.

Meanwhile, in backhaul links, the case where all the last OFDM symbols of allocated PRBs cannot be used occurs. A specific constant β is applied to compensate this part. Namely, as indicated below in Equation 8, a region occupied by the R-PDCCH is excluded from the number of available symbols and available RBs in a backhaul subframe, and a resource of a designated ratio is further excluded from available resources.

In this case, β is defined as a ratio of the last symbol of the backhaul subframe to the number of symbols of the backhaul subframe including the last symbol, that is, as the inverse of the number of symbols of the backhaul subframe including the last symbol. Although it is desirable to calculate an optimized β in consideration of variation in the number of REs which can be used or is used as the R-PDSCH, a specific constant (e.g., β=1/12, 1/11, or 1/10) may be used for convenience of calculation. Since variation in the number of OFDM symbols used as the R-PDSCH is previously signaled by an upper layer, a relay node may calculate the β value, or the β value may be previously signaled.

$$N_{PRB2}^{R\text{-}PDSCH} = (N_{PRB1}^{R\text{-}PDSCH} - \lceil N_{PRB}^{R\text{-}PDCCH} \cdot \alpha_i \rceil) \cdot (1-\beta)_{(a)}$$

$$N_{PRB2}^{R\text{-}PDSCH} = (N_{PRB1}^{R\text{-}PDSCH} - \lfloor N_{PRB}^{R\text{-}PDCCH} \cdot \alpha_i \rfloor) \cdot (1-\beta)_{(b)} \quad \text{[Equation 8]}$$

Alternatively, as indicated in the following Equation 9, a method of calculating only the number of available symbols in the backhaul frame and then excluding a region occupied by the R-PDCCH may be used.

$$N_{PRB2}^{R\text{-}PDSCH} = (N_{PRB1}^{R\text{-}PDSCH} \cdot \beta - \lceil N_{PRB}^{R\text{-}PDCCH} \cdot \alpha_i \rceil)_{(a)}$$

$$N_{PRB2}^{R\text{-}PDSCH} = (N_{PRB1}^{R\text{-}PDSCH} \cdot \beta - \lfloor N_{PRB}^{R\text{-}PDCCH} \cdot \alpha_i \rfloor)_{(b)} \quad \text{[Equation 9]}$$

When R-PDCCHs are interleaved, PRBs where the interleaved R-PDCCHs are present should be excluded from RBs to which R-PDSCHs are allocated.

To what extent a region occupied by R-PDCCHs is excluded may depend on the number $N_{PRB1}$ of RBs to which the R-PDSCHs are allocated. In fact, if the number of RBs occupied by the R-PDCCH is 2 when $N_{PRB1}$=2, then nearly 50% of REs are occupied by the R-PDCCH. However, when $N_{PRB1}$=20, only 5% of the REs are occupied by the R-PDCCH and an effective code rate is not greatly influenced by the R-PDCCH. In this case, waste may occur in terms of frequency efficiency. Accordingly, whether to disregard a region occupied by the R-PDCCH or to determine a TBS in consideration of the R-PDCCH may be desirably considered according to a range of $N_{PRB1}$.

For example, assuming that the R-PDCCH always occupies 2 PRB pairs irrespective of the $N_{PRB1}$ value, if $N_{PRB1}<=10$, then the TBS is determined using a value of $N_{PRB1}-1$ (=$N_{PRB2}$) considering the R-PDCCH, but if $N_{PRB1}>10$, then the TBS when no R-PDCCH is present is used under the assumption that the presence of the R-PDCCH does not have a significant influence on a code rate. That is, the assumption that the presence of the R-PDCCH does not greatly affect the code rate should be satisfied. A threshold value of $N_{PRB1}$=10 is merely exemplary. A plurality of threshold values may be set to subdivide the threshold value considering influence caused by the presence of the R-PDCCH. For example, the subdivided threshold values such as the cases where variation in available REs is within 10%, between 10% and 20%, and between 20% and 30% may be applied. In this case, a value obtained by changing % into the number of RBs may be used as the threshold value.

In the above proposed methods, the number of available REs or the number of available RBs may be considered as the number excluding a CRS, demodulation RS (DM-RS), and CSI-RS as well as REs occupied by the R-PDCCH. That is, as mentioned previously, it is desirable to calculate the TBS based on a resource region to which the PDSCH is actually transmitted. It may be possible for convenience of calculation to prescribe rules for considering only the R-PDCCH; only the R-PDCCH and the CRS; the R-PDCCH, CRS and DM-RS; the R-PDCCH, CRS, DM-RS, and CSI-RS; or the like. Such rules may be desirably set to determine an optimal TBS while maintaining the modulation order and minimizing variation in the code rate.

Figure 17:
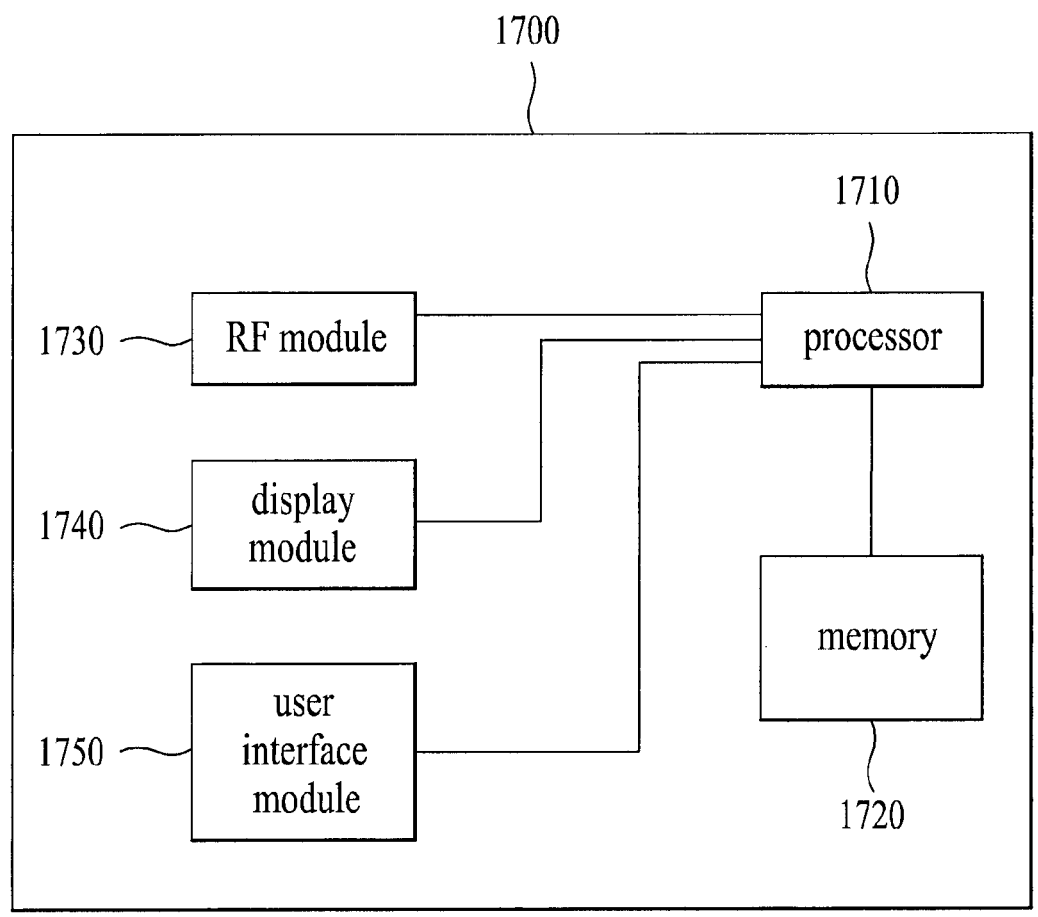
FIG. 17 is a block diagram of a communication device according to an exemplary embodiment of the present invention.

FIG. 17 is a block diagram of a communication device according to an exemplary embodiment of the present invention.

Referring to FIG. 17, a communication device 1700 includes a processor 1710, a memory 1720, an RF module 1730, a display module 1740, and a user interface module 1750.

The communication device 1700 is depicted for convenience of description and may further include necessary modules. Some modules of the communication device 1700 may be further divided into detailed modules. The processor 1710 is configured to operate according to the exemplary embodiments of the present invention described with reference to the drawings. For a detailed description of the operation of the processor 1710, reference may be made to a description in conjunction with FIGS. 1 to 16.

The memory 1720 is connected to the processor 1710 and stores operating systems, applications, program codes, data, and the like. The RF module 1730 is connected to the processor 1710, and converts a baseband signal into a radio signal or the radio signal into the baseband signals. To this end, the RF module 1730 performs analog conversion, amplification, filtering, and frequency up-conversion or performs the inverse of these processes. The display module 1740 is connected to the processor 1710 and displays a variety of information. The display module 1740 uses, but is not limited to, a Liquid Crystal Display (LCD), a Light Emitting Diode (LED), an Organic Light Emitting Diode (OLED), or the like. The user interface module 1750 is connected to the processor 1710 and may be configured by a combination of user interfaces such as a keypad, a touch screen, etc.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description has been made of a data transmission and reception relationship between a relay node and an eNB. Here, a specific operation described as performed by the eNB may be performed by an upper node of the eNB. Namely, it is apparent that, in a network comprised of a plurality of network nodes including the eNB, various operations performed for communication with the UE may be performed by the eNB, or network nodes other than the eNB. The term 'eNB' may be replaced with the term 'fixed station', 'Node B', 'base station, 'access point', etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method and apparatus for determining the size of a transport block transmitted by the eNB to the relay node in the wireless communication system has been described as applied to the 3GPP LE system, they may applied to various multiple antenna radio communication systems in addition to the 3GPP LTE system.

The invention claimed is:

1. A method for receiving a Relay node dedicated Physical Downlink Shared Channel (R-PDSCH) from a base station by a relay node in a radio communication system, the method comprising:

receiving, from the base station, a Modulation and Coding Scheme (MCS) index and the number $N^{R\text{-}PDSCH}_{PRB1}$ of first resource blocks to which the R-PDSCH is transmitted, under the assumption that a Relay node dedicated Physical Downlink Control Channel (R-PDCCH) is not transmitted;

estimating the number $N^{R\text{-}PDSCH}_{PRB2}$ of second resource blocks to which the R-PDSCH is actually transmitted, using the number $N^{R\text{-}PDSCH}_{PRB1}$ of the first resource blocks and using the number $N^{R\text{-}PDCCH}_{PRB}$ of resource blocks to which the R-PDCCH is transmitted;

selecting the size of a transport block mapped to the R-PDSCH, using the number $N^{R\text{-}PDSCH}_{PRB2}$ of the second resource blocks and using a transport block index corresponding to the MCS index; and decoding the R-PDSCH, using the size of the transport block and using a modulation order corresponding to the MCS index.

2. The method according to claim 1, wherein the estimating of the number $N^{R\text{-}PDSCH}_{PRB2}$ of the second resource blocks is performed based on the following Equation 1:

$$N_{PRB2}^{R\text{-}PDSCH} = N_{PRB1}^{R\text{-}PDSCH} - \lfloor N_{PRB}^{R\text{-}PDCCH} \cdot \alpha_i \rfloor \quad \text{[Equation 1]}$$

(where $N_{PRB1}^{R\text{-}PDSCH}$ is the number of the first resource blocks, $N_{PRB2}^{R\text{-}PDSCH}$ is the number of the second resource blocks, $N_{PRB}^{R\text{-}PDCCH}$ is the number of the resource blocks to which the R-PDCCH is transmitted, and $\alpha_i$ is an arbitrary value between 0 and 1).

3. The method according to claim 1, wherein the estimating of the number $N^{R\text{-}PDSCH}_{PRB2}$ of the second resource blocks includes excluding the number of resource blocks corresponding to last symbols in a backhaul subframe transmitted from the base station to the relay node from the number of the first resource blocks.

4. The method according to claim 3, wherein the estimating of the number $N^{R\text{-}PDSCH}_{PRB2}$ of second resource blocks is performed based on the following Equation 2:

$$N_{PRB2}^{R\text{-}PDSCH} = (N_{PRB1}^{R\text{-}PDSCH} - \lfloor N_{PRB}^{R\text{-}PDCCH} \cdot \alpha_i \rfloor) \cdot (1-\beta) \quad \text{[Equation 2]}$$

(where $N_{PRB1}^{R\text{-}PDSCH}$ is the number of the first resource blocks, $N_{PRB2}^{R\text{-}PDSCH}$ is the number of the second resource blocks, $N_{PRB}^{R\text{-}PDCCH}$ is the number of the resource blocks to which the R-PDCCH is transmitted, $\alpha_i$ is an arbitrary value between 0 and 1, and $\beta$ is the inverse of the number of available symbols of the backhaul subframe).

5. A relay apparatus in a radio communication system, comprising:

a receiving module for receiving, from a base station, a Modulation and Coding Scheme (MCS) index and the number $N^{R\text{-}PDSCH}_{PRB1}$ of first resource blocks to which a Relay apparatus dedicated Physical Downlink Shared Channel (R-PDSCH) is transmitted, under the assumption that a Relay apparatus dedicated Physical Downlink Control Channel (R-PDCCH) is not transmitted; and a processor for estimating the number $N^{R\text{-}PDSCH}_{PRB2}$ of second resource blocks to which the R-PDSCH is actually transmitted, using the number $N^{R\text{-}PDSCH}_{PRB1}$ of the first resource blocks and using the number $N^{R\text{-}PDCCH}_{PRB}$ of resource blocks to which the R-PDCCH is transmitted, selecting the size of a transport block mapped to the R-PDSCH, using the number $N^{R\text{-}PDSCH}_{PRB2}$ of the second resource blocks and using a transport block index corresponding to the MCS index, and decoding the R-PDSCH, using the size of the transport block and using a modulation order corresponding to the MCS index.

6. The relay apparatus according to claim 5, wherein the processor estimates the number $N^{R\text{-}PDSCH}_{PRB2}$ of the second resource blocks based on the following Equation 1:

$$N_{PRB2}^{R\text{-}PDSCH} = N_{PRB1}^{R\text{-}PDSCH} - \lfloor N_{PRB}^{R\text{-}PDCCH} \cdot \alpha_i \rfloor \quad \text{[Equation 1]}$$

(where $N_{PRB1}^{R\text{-}PDSCH}$ is the number of the first resource blocks, $N_{PRB2}^{R\text{-}PDSCH}$ is the number of the second resource blocks, $N_{PRB}^{R\text{-}PDCCH}$ is the number of the resource blocks to which the R-PDCCH is transmitted, and $\alpha_i$ is an arbitrary value between 0 and 1).

7. The relay apparatus according to claim 5, wherein the processor estimates of the number $N^{R\text{-}PDSCH}_{PRB2}$ of the second resource blocks by excluding the number of resource blocks corresponding to last symbols in a backhaul subframe transmitted from the base station to the relay apparatus from the number of the first resource blocks.

8. The relay apparatus according to claim 7, wherein the processor estimates the number $N^{R\text{-}PDSCH}_{PRB2}$ of the second resource blocks based on the following Equation 2:

$$N_{PRB2}^{R\text{-}PDSCH} = (N_{PRB1}^{R\text{-}PDSCH} - \lfloor N_{PRB}^{R\text{-}PDCCH} \cdot \alpha_i \rfloor) \cdot (1-\beta) \quad \text{[Equation 2]}$$

(where $N_{PRB1}^{R\text{-}PDSCH}$ is the number of the first resource blocks, $N_{PRB2}^{R\text{-}PDSCH}$ is the number of the second resource blocks, $N_{PRB}^{R\text{-}PDCCH}$ is the number of the resource blocks to which the R-PDCCH is transmitted, $\alpha_i$ is an arbitrary value between 0 and 1, and $\beta$ is the inverse of the number of available symbols of the backhaul subframe).

* * * * *